Figure 1:
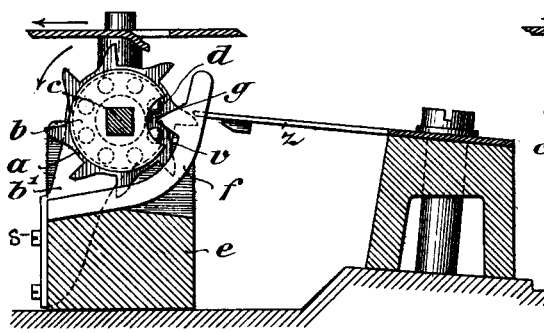

No. 676,002. Patented June 11, 1901.
A. JUNGHANS.
AUTOMATIC MUSICAL INSTRUMENT.
(Application filed Jan. 8, 1901.)

(No Model.)

Fig. 6ª.

Witnesses:
Walter Allen
A. W. Harrison

Inventor
Arthur Junghans
by Herbert W. T. Jenner
Attorney.

UNITED STATES PATENT OFFICE.

ARTHUR JUNGHANS, OF SCHRAMBERG, GERMANY.

AUTOMATIC MUSICAL INSTRUMENT.

SPECIFICATION forming part of Letters Patent No. 676,002, dated June 11, 1901.

Application filed January 8, 1901. Serial No. 42,475. (No model.)

*To all whom it may concern:*

Be it known that I, ARTHUR JUNGHANS, commercial counselor, a subject of the King of Würtemberg, residing at Schramberg, Kingdom of Würtemberg, German Empire, have invented certain new and useful Improvements in Automatic Musical Instruments; and I do hereby declare the following to be a full, clear, and exact description of the invention, such as will enable others skilled in the art to which it appertains to make and use the same.

This invention relates to damping means adapted for use in automatic musical instruments or musical boxes fitted with steel combs or vibrating tongues, the distinguishing feature of which is that it accomplishes in a more perfect manner than hitherto the object of instantaneously and noiselessly damping each tongue of the comb after it is set in vibration and likewise suspending the damping effect immediately the next tooth of the tongue-plucking wheel or pinion comes into operation.

The principal improvement of the present invention consists in the fact that each plucking wheel or pinion is provided with as many lateral projections as it has tongue-vibrating teeth, one of which projections—namely, that which happens to be exactly opposite the tongue which is being struck or plucked at the time—is adapted in each case to operate a damper-spring precisely at the right moment. Now this damping-spring itself, apart from its lateral spring action, is in none of its constituent parts capable of any vibration, and it admits of a direct and rapid transmission of the action exercised upon it from the point of application of the lateral projection of the pinion to its own point of contact with the tongue. Any jar or noise apt to be caused by friction is entirely avoided according to the present invention.

A further improvement consists in the special method adopted in fitting together the tongue-operating wheels or pinions provided with lateral projections, as before stated. Each of the wheels or pinions which are set in a row is supplemented by a small disk, which is incapable of rotary motion, and is provided with an annular space or recess to accommodate the lateral projections of its adjacent wheel or pinion, while its cylindrical hub or nave affords a bearing for such wheel or pinion. Some of the supplemental disks, which are cut away at one part so as to permit the lateral movement of the damper-springs, may, if desired, for the purpose of steadying the supporting shaft or stem against vibration be constructed in the shape of auxiliary supports or brackets.

Figure 2:
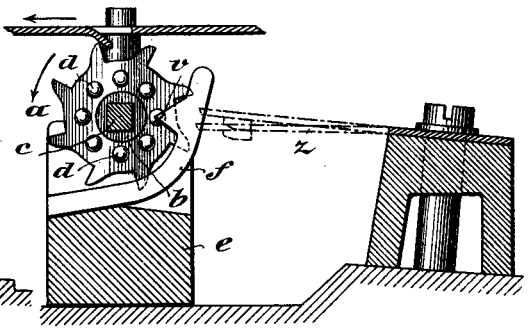
Figure 3:
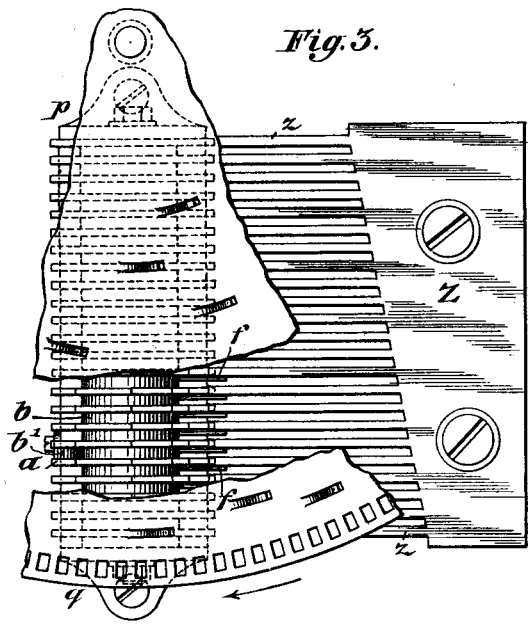
Figure 4:
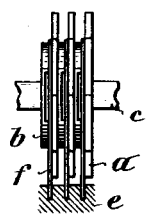
Figure 4:
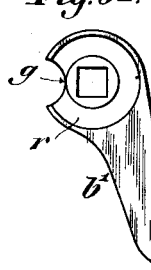
Figure 5:
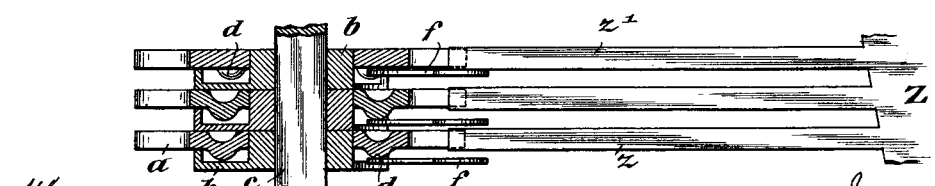

In the accompanying drawings, Figures 1 and 2 are sectional elevations showing, respectively, the positions of the mechanism at the time of damping and at the moment a tongue is struck by a tooth of the wheel or pinion, the damping effect in the latter case being discontinued. It will be seen that the supplemental disk, against which the tongue-vibrating wheel or pinion is adapted to revolve, is omitted from Fig. 2. Fig. 3 is a top view or plan of a tongue-comb and of a set of tongue-vibrating wheels or pinions arranged in a row upon a square shaft or rod and fitted with their supplemental disks and damper-springs, portions of the tune-sheet being also represented. Fig. 4 is an elevation of a number of pinions with their accessories viewed from the tongue-comb side. Fig. 5 is an enlarged horizontal section of a number of wheels or pinions and disks arranged in a row, one damper-spring being shown in the act of damping and others in the inoperative position; and Figs. 6 and 6ª show, respectively, a front elevation and an end elevation of a disk $b'$, constructed to serve as a bracket.

The wheels or pinions $a$, alternating with annularly-recessed supplemental disks $b$, are mounted upon a stationary square rod or shaft $c$. This shaft is held by uprights $p$ and $q$ at the ends of a supporting bridge or frame $e$, arranged upon the plate A, supporting the whole musical works opposite the comb of tongues Z. Each of the disks $b$, by its hub fitting into the cylindrical aperture of the adjoining wheel or pinion $a$, forms a bearing upon which the wheel or pinion can freely revolve. Corresponding to the teeth of the wheels or pinions are concentrically-arranged projections or nipples $d$, rising from one side of each wheel or pinion, the space required for such nipples to work in being afforded by an annular recess $r$, provided in the adjoining disk. Each disk is formed with a gap or opening $g$ at the part facing the tongue $z$, the projections $d$ moving past this gap or opening at each intermittent movement of the wheel or pinion.

The damper-springs $f$ are comparatively wide flat springs firmly secured to the supporting bridge or frame $e$, each of the damper-springs extending between two wheels or pinions and projecting into one of the said gaps or openings $g$ of a supplemental disk, the damper-springs being fitted with inward extensions $v$ for the purpose.

When the projections $d$ of the wheels or pinions $a$ are not acting upon these extensions $v$, the springs $f$ take up a position in which their front parts will exercise lateral pressure against the tongues, and thereby produce a damping effect, as illustrated in the case of the tongue $z'$ in Fig. 5.

When in the turning of the tune-sheet one of its projections imparts a partial revolution to a wheel or pinion, the result is that just before the tongue is actuated the projection or nipple $d$, coming into contact with the extension $v$, presses the damper-spring $f$ laterally out of contact with such tongue, (see the lower part of Fig. 5,) so that the latter is left free to vibrate and emit a sound. The moment the projection $d$ has moved past the extension $v$ of the damper-spring $f$ the latter resumes its original position and presses against the tongue, thereby instantaneously damping it—that is, checking the continuation of its sonorous vibration without any attendant noise. To provide against any incidental noise, it is deemed essential that the projections $d$ should come in contact with the springs at one point only and that the transmission of motion over the short space between that point and the point of contact with the tongue should be effected by a rigid portion of the body of the spring.

The arrangement of the wheels or pinions $a$ and the intermediate or "spacing" disks $b$, which, owing to the recessed portions $r$, support the wheels or pinions by an annular bearing outside the set of nipples $d$, affords additional security against vibration, especially as the wheels or pinions, which are made, preferably, somewhat thin, are thereby protected from any share in the vibratory motion imparted to the tongues and from consequent lateral wear.

Figure 6:
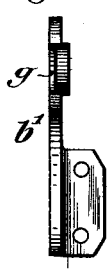

In Figs. 1 and 3, $b'$ designates one of the disks constructed as a bracket, and Figs. 6 and $6^a$ give two detail views of the same. Such a bracket, the base of which is secured to the supporting-bridge $e$ by means of screws $s$, will prove useful where the rod or shaft $c$ extends unsupported for a somewhat considerable distance between the uprights $p$ and $q$, so that an additional support at an intermediate point is desirable to protect the said shaft itself from vibration.

What I claim is—

1. In an automatic musical instrument, having a steel comb, the combination of tongue-vibrating wheels, lateral projections upon such wheels, intermediate or supplemental disks, side recesses in such disks to receive the projections on the wheels and damper-springs having a tendency to press laterally against the tongues operated instantaneously and without any attendant noise by means of the said projections, substantially as herein set forth.

2. In an automatic musical instrument having a steel comb, the combination of tongue-vibrating wheels, intermediate disks, annular recesses in such disks, a rod or shaft upon which such disks are supported, supports at both ends for said rod and a base attached to a disk intermediate of the end supports, substantially as herein shown and described.

3. In an automatic musical instrument having a steel comb of vibrating tongues, the combination of tongue-vibrating wheels, lateral projections on one side of each of such wheels, supplemental disks between the wheels, a fixed shaft or bar upon which such disks are mounted, a boss on each disk forming a bearing on which its accompanying wheel can turn, an annular recess in each disk to receive the lateral projections on its accompanying wheel, an inwardly-projecting flange at the periphery of each disk forming an annular supporting-bearing for its wheel, damper-springs having a tendency to press laterally against the tongues, a projection on each damper-spring operated instantaneously by the lateral projections on the vibrating wheels, and a gap or opening in each disk to receive the projection of its accompanying damper-spring, substantially as herein set forth.

In testimony whereof I affix my signature in presence of two witnesses.

ARTHUR JUNGHANS.

Witnesses:
 WM. HAHN,
 F. HAEUSSERMANN.